United States Patent
Davis et al.

(10) Patent No.: US 8,286,334 B2
(45) Date of Patent: Oct. 16, 2012

(54) METHOD OF MANUFACTURING PRE-SLIDERS FOR READ WRITE HEADS BY ANNEALING TO SATURATION

(75) Inventors: Damaris Davis, Campbell, CA (US);
Hardayal S. Gill, Palo Alto, CA (US);
Kenneth D. MacKay, San Jose, CA (US); Xiao Z. Wu, San Jose, CA (US)

(73) Assignee: Hitachi Global Storage Technologies, Netherlands B.V., Amsterdam (NL)

(*) Notice: Subject to any disclaimer, the term of this patent is extended or adjusted under 35 U.S.C. 154(b) by 1471 days.

(21) Appl. No.: 11/486,549

(22) Filed: Jul. 14, 2006

(65) Prior Publication Data
US 2008/0010811 A1    Jan. 17, 2008

(51) Int. Cl.
*G11B 5/127* (2006.01)
*H04R 31/00* (2006.01)

(52) U.S. Cl. ............ 29/603.16; 29/603.12; 29/603.15; 29/603.18; 360/121; 360/122; 360/317; 451/5; 451/41

(58) Field of Classification Search ............ 29/603.12, 29/603.15, 603.16, 603.18; 451/5, 8, 10, 451/28, 36, 37, 41
See application file for complete search history.

(56) References Cited

U.S. PATENT DOCUMENTS

| | | | |
|---|---|---|---|
| 4,951,381 A | 8/1990 | Yamazaki et al. | |
| 5,713,123 A * | 2/1998 | Toyoda et al. | 29/603.12 |
| 5,772,493 A | 6/1998 | Rottmayer et al. | |
| 5,872,684 A | 2/1999 | Hadfield et al. | |
| 6,118,622 A | 9/2000 | Gill | |
| 6,170,149 B1 | 1/2001 | Oshiki et al. | |
| 6,679,762 B2 | 1/2004 | Fatula, Jr. et al. | |
| 6,857,937 B2 | 2/2005 | Bajorek | |
| 2004/0235394 A1 | 11/2004 | Ota et al. | |

FOREIGN PATENT DOCUMENTS

| | | |
|---|---|---|
| JP | 1076418 | 3/1989 |
| JP | 2083809 | 3/1990 |
| JP | 3295017 | 12/1991 |
| JP | 4186518 | 7/1992 |
| JP | 4339308 | 11/1992 |
| JP | 4366408 | 12/1992 |
| JP | 5036047 | 2/1993 |
| JP | 9293221 | 11/1997 |
| JP | 11328642 | 11/1999 |

\* cited by examiner

*Primary Examiner* — Paul D Kim (57) ABSTRACT

Various embodiments of the present invention pertain to manufacturing pre-sliders by annealing to saturation. According to one embodiment, pre-sliders are lapped to prepare for air bearing surfaces for the pre-sliders. The pre-sliders are annealed to saturation to level off the amount of overcoat expansion for the pre-sliders.

20 Claims, 8 Drawing Sheets

FIG. 1
(CONVENTIONAL)

METHOD OF MANUFACTURING PRE-SLIDERS FOR READ WRITE HEADS BY ANNEALING TO SATURATION

TECHNICAL FIELD

Embodiments of the present invention relate to manufacturing pre-sliders for read write heads. More specifically, embodiments of the present invention relate to dealing with the problem of a pre-slider's overcoat protruding after annealing pre-sliders.

BACKGROUND

Disk drives are standard devices for storing data. A disk drive typically includes platters (also known as disks) that the data are stored on and a read-write head that is used to write data onto the platters and to read the data from the platters. The read-write head is manufactured to include what is commonly known as a slider that has aerodynamic properties to fly over a platter. A slider flies over a location on a platter for the purpose of writing data to that location or reading data from that location. The distance between a slider and a platter that the slider is flying over is commonly referred to as a "fly height."

Typically a slider includes a write head for writing data to a platter and a read sensor for reading data from the platter. Both write head and read sensors have dimension requirements, such as a throat-height for a write head and stripe-height for a read sensor. The air bearing surface (ABS) of a slider provides the aerodynamic properties that enables the slider to fly over a platter and to be positioned over a desired location on the platter. A write head is also commonly known as a writer. A read sensor is also commonly known as a read head or a reader.

In order for a slider as well as the read sensor and the write head to function properly, a slider's ABS after lapping needs to be flat and smooth. A flat and smooth ABS provides a foundation for achieving desired aerodynamic properties, as will become more evident. Further the write and read heads need to have appropriate dimensions.

Figure 1:
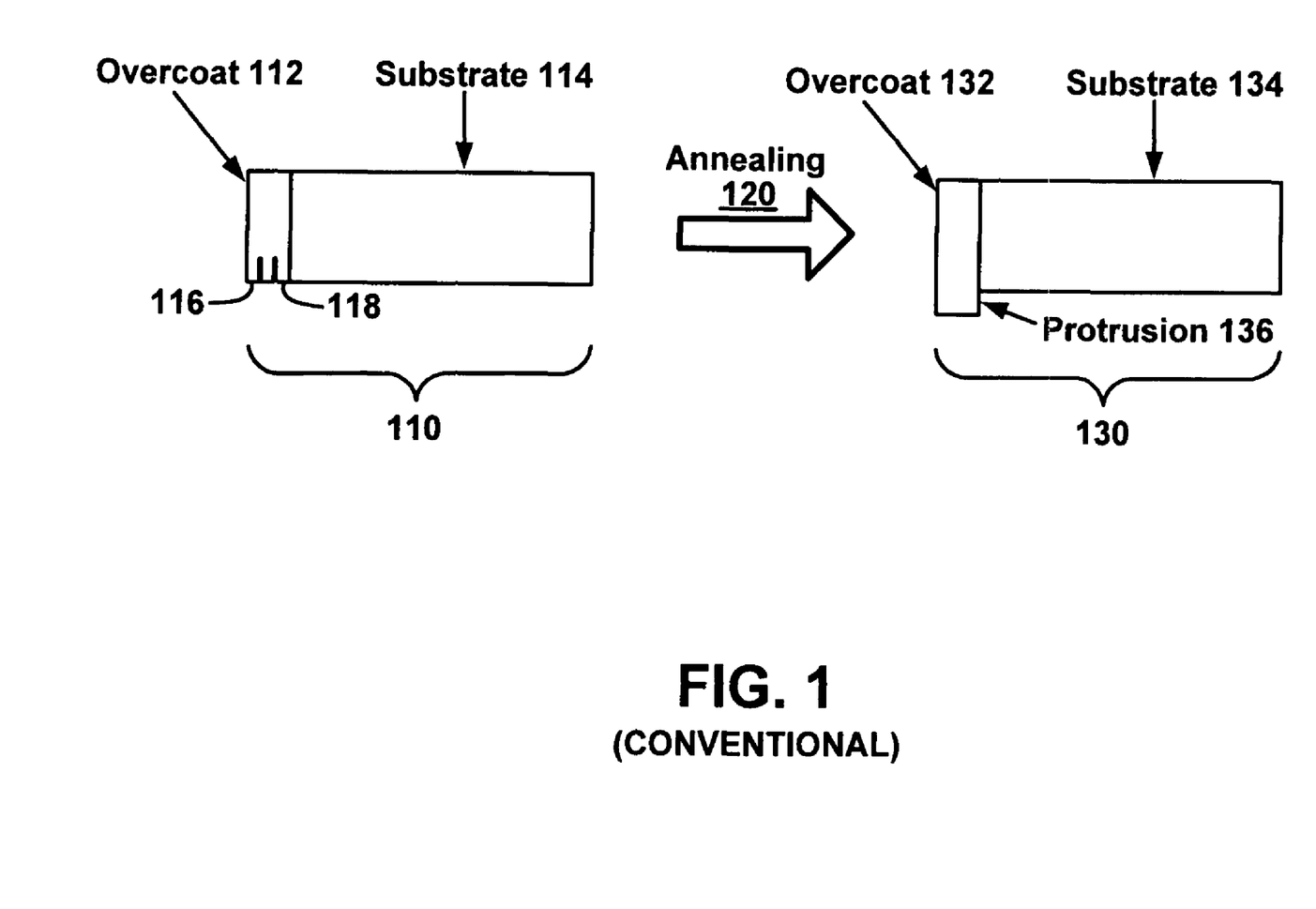
FIG. 1 depicts part of a conventional process for manufacturing sliders.

A component or a part of a component which is ultimately manufactured into a slider, as will become more evident, shall be referred to herein as a "pre-slider." FIG. 1 depicts part of a conventional process for manufacturing a pre-slider. Wafers are used in manufacturing read write heads and the associated pre-sliders.

The wafers can be cut into rows which are lapped in order to provide a flat and smooth ABS for the pre-sliders as well as to achieve target dimensions, such as the stripe height for the read head and throat-height for writer. Lapping can be performed in multiple stages using, for example, progressively finer grained lapping pads to achieve a smooth ABS and desired dimensions. In order to achieve optimized read/write performance in a disk drive, low fly heights, such as 10 nanometers or less, are desired. Patterns can be fabricated on the lapped ABS as a part of achieving desired aerodynamic properties. Among other things, a flat and smooth ABS provides a foundation for building the pattern on the lapped ABS in order to achieve desired fly heights.

FIG. 1 depicts a pre-slider 110 after lapping has been performed. Although pre-slider 110 can be a part of a row, FIG. 1 depicts the pre-slider 110 in isolation for the sake of illustration. Pre-slider 110 includes an overcoat 112 and a substrate 114. The overcoat 112 can be made of alumina. The read sensor 116 and the write head 118 are built inside of the overcoat 112.

A high temperature can be applied to the pre-sliders to align the magnetic moments of the material from which sensors 116 are made. More specifically, a high temperature can be applied to the pinning layer of the read sensor 116. The process of applying a high temperature to the pre-sliders is commonly referred to as annealing 120. Pre-slider 130 has been annealed 120. Pre-slider 130 includes an overcoat 132 and substrate 134. As a result of being annealed 120, the overcoat 132 has expanded resulting in a protrusion 136. Since the ABS of a pre-slider must be flat and smooth in order for a read write head to glide properly over a platter, the protrusion 136 causes the pre-slider 130 to be unsuitable. Only those pre-sliders that do not have protrusions can continue in the manufacturing process to become acceptable sliders.

SUMMARY OF THE INVENTION

Various embodiments of the present invention pertain to manufacturing pre-sliders for read write heads by annealing to saturation. According to one embodiment, pre-sliders are lapped to prepare for air bearing surfaces for the pre-sliders. The pre-sliders are annealed to saturation to level off the amount of overcoat expansion for the pre-sliders.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

Figure 2:
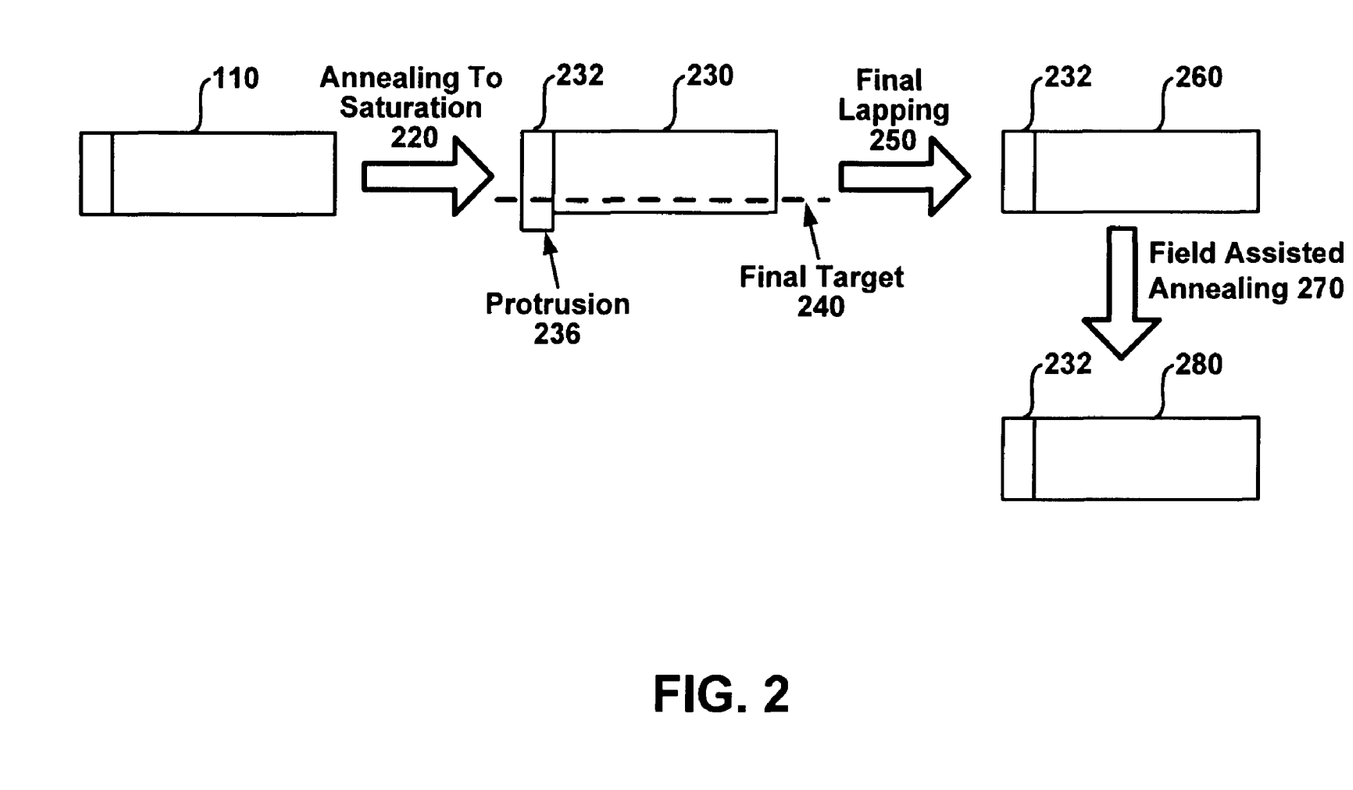
FIG. 2 depicts a process of manufacturing pre-sliders, according to various embodiments of the present invention.

As already stated, with the conventional art as depicted in FIG. 1 a protrusion 136 can result after a pre-slider 130 is annealed 120. FIG. 2 depicts a process of manufacturing pre-sliders, according to various embodiments of the present invention.

Figure 8:
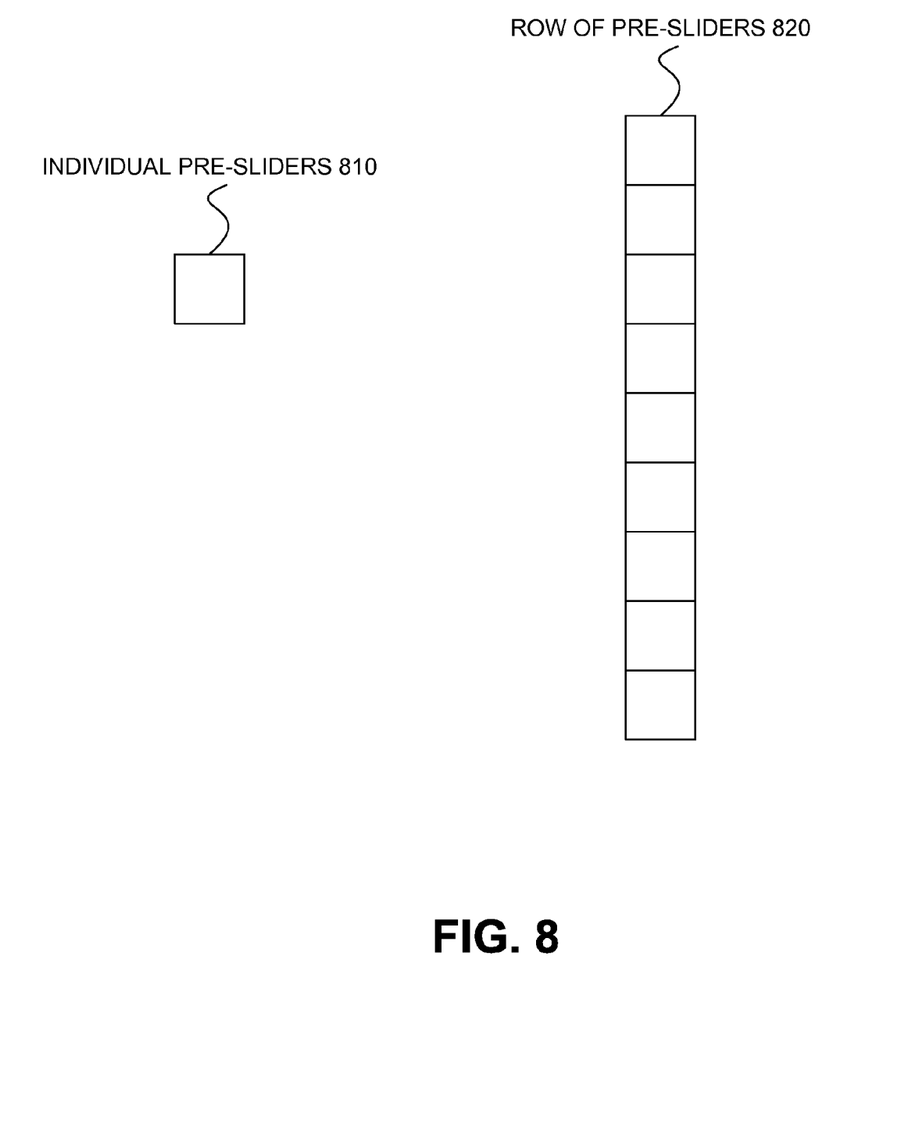
FIG. 8 depicts an individual pre-slider and a row of pre-sliders (row form), according to one embodiment.

The pre-sliders 110 can be cut out of the wafer for example into row form or into individual sliders before annealing to saturation 220 is performed. For example, FIG. 8 depicts a top view of an individual pre-slider 810 that has been cut out of a wafer and a row of pre-sliders 820 (row form) that has been cut out of a wafer. The pre-sliders 110 can be lapped by lapping rows of pre-sliders 110 or by lapping individual pre-sliders 110. The pre-sliders 110 are annealed to saturation 220, as will become more evident in FIG. 4, which can result in pre-sliders 230 that have protrusions 236.

According to another embodiment, the pre-sliders 230 are lapped again 250 to the final target 240 for the stripe height which eliminates protrusions 236. Protrusions 236 can prevent sliders from flying over platters at desired fly heights, as already described herein. If the final lapping 250 causes pre-sliders 260 to have misaligned moments of the pinning layer inside read sensors, as will become more evident, field assisted annealing 270 can be performed on the pre-sliders 260. Since pre-sliders 230 were annealed to saturation, the overcoats 232 will not expand again in the event that the pre-sliders 260 are annealed again 270.

Annealing to Saturation

Figure 3:
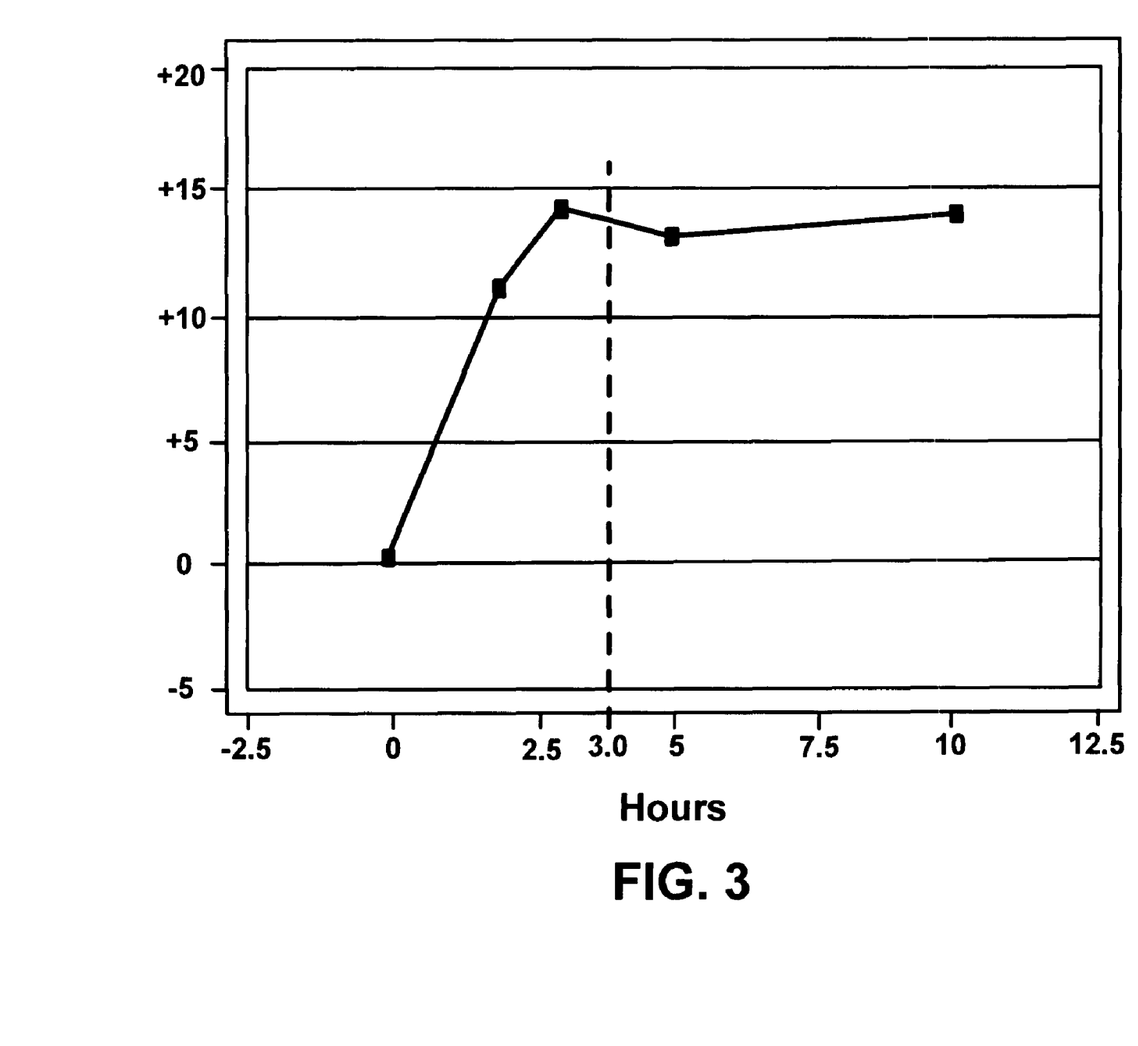
FIG. 3 depicts a graph that plots the amount that an overcoat expands as annealing to saturation is performed, according to one embodiment.

FIG. 3 depicts a graph that plots the amount that an overcoat expands as annealing to saturation is performed, according to one embodiment. The Y axis depicts the mean of the overcoat expansion, which results in protrusions and the X axis depicts the number of hours that the annealing was performed. At approximately 3 hours the amount that the overcoat is expanding flattens out. For example, from 0 hours to approximately 2.5 hours, the overcoat expands rapidly. However, after 3 hours, the amount of overcoat expansion levels off because the pre-sliders have been annealed to saturation.

According to one embodiment, the range of temperatures used for the annealing to saturation ranges from approximately 100 degrees Celsius to 220 degrees Celsius. The specific temperature used for the annealing to saturation may depend on a read sensor's design. According to a preferred embodiment, the temperature used for the annealing to saturation is approximately 220 degrees Celsius.

According one embodiment, the range of time used for the magnetic field assisted annealing ranges from approximately a few seconds to 4 hours. According to a preferred embodiment, the annealing to saturation is performed for approximately 3 hours.

The specific temperature and time used for the annealing to saturation depends on the material properties and dimensions of a head's overcoat, and the temperature used for the magnetic field assisted annealing, according to one embodiment. The magnetic field assisted annealing in turn can depend on the read sensor's design.

As already stated annealing, such as annealing pre-sliders 230 to saturation, can result in protrusions due to the overcoat 232 expanding. However, since pre-sliders 230 were annealed to saturation the overcoats 232 will not expand again in the event that the pre-sliders 260 are annealed again 270, as will become more evident.

Protrusions

As annealing is performed on materials, such as the alumina that an overcoat is made of, the materials may expand to create protrusions (also known as deformations). Deformations include both plastic and elastic portions. Elastic describes a deformation that shrinks back after it has been annealed. Plastic describes a deformation that expands and does not shrink back after it has been annealed. Protrusions 236 result from the plastic part of the deformation. By annealing to saturation 220, the overcoat will not expand again in the event that the pre-slider is annealed again, for example, using a field assisted annealing 270, as will become more evident.

Final Lapping

The pre-sliders 230 that have protrusions are lapped again, for example, using final lapping 250, according to one embodiment. A pre-slider 230 is lapped 250 to a final target 240 to provide a desired write head and read head dimensions, according to another embodiment. For example, as will become more evident, before final lapping 250 is performed the stripe height of read sensor is up to 1 micron long, however, after the final lapping 250 is performed, the stripe height is approximately 0.1 micron. According to another embodiment, final lapping 250 removes the part of a protrusion that is plastic.

Although lapping is part of the manufacturing process, lapping, such as final lapping 250, subjects pre-sliders 230 to mechanical stress. As a result, for some pre-sliders 260 that have been subjected to the final lapping 250, the amplitude of the pre-sliders 260 may be reversed.

Reversed Amplitude

Figure 4:
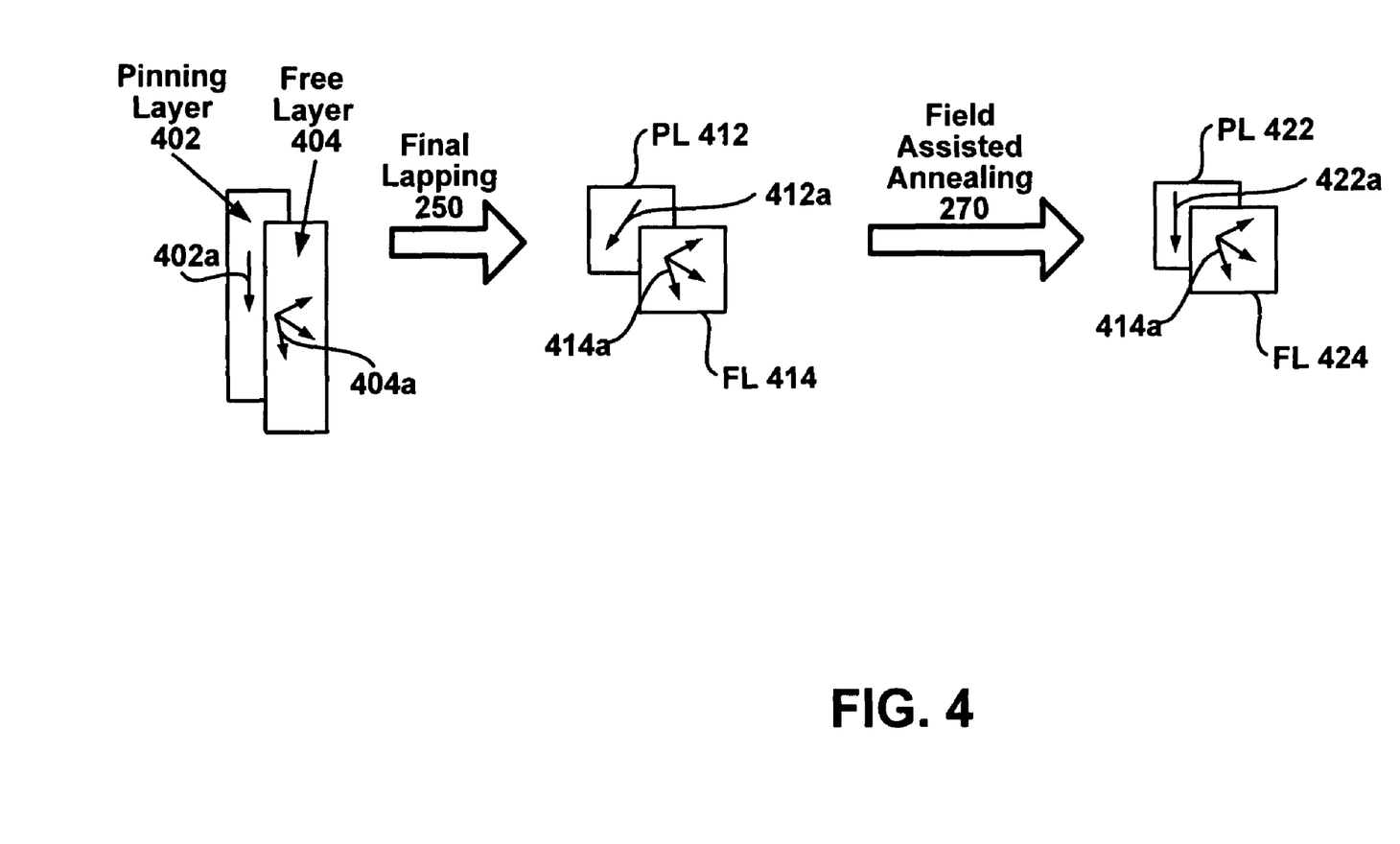
FIG. 4 depicts a method of manufacturing pre-sliders, according to one embodiment.

The amplitude reversal can be caused by a misalignment of the magnetic moments in a pinning layer of the read sensor, as will become more evident. FIG. 4 depicts a method of manufacturing pre-sliders, according to one embodiment. FIG. 4 depicts a pinning layer 402 and a free layer 404 and their respective magnetic moments 402a and 414a of a read sensor that can be associated with a pre-slider 230, according to one embodiment.

A read sensor associated with a slider is used to read data, in the form of magnetic signals from a platter. The magnetic signals are translated into binary 1s and 0s. As a part of the manufacturing process the pinning layer's magnetic moment 402a is set. When the manufacturing process has completed, a free layer's magnetic moment can rotate in response to external magnetic signals, for example, that are received as a result of reading data from a platter. When the magnetic signal on the platter represents a binary 1, the free layer's magnetic moment typically rotates upwards. In contrast, when the magnetic signal on the disk represents a binary 0, the free layer's magnetic moment typically rotated downwards. When the manufacturing process is completed, the pinning layer is used as a reference to determine whether the free layer's magnetic moment is rotated upwards or downwards.

A final lapping 250 is performed on the pre-slider 230, according to one embodiment. As already stated, according to one embodiment, the final lapping 250 provides a desired stripe height. For example, the stripe height (and thus the pinning layer 402 and the free layer 404) is up to 1 micron long before initial lapping is performed. According to another embodiment after the final lapping 250 is performed, the stripe height (and thus the pinning layers 412, 422 and the free layers 414, 424) is approximately 0.1 micron long.

Lapping causes the pre-slider 230 to be subjected to mechanical stress. As a result, for some pre-sliders 260 the amplitude of the pre-sliders 260 may be reversed due to misalignment of the magnetic moment of the pinning layer 412. For example, pinning layer 412's the magnetic moment 412a is misaligned resulting in a reversed amplitude. The term "reversed amplitude" shall include misaligned moments that result from a pinning layer being fully flipped, i.e., rotated 180 degrees, or partially flipped, i.e., rotated less than 180 degrees.

As the recording density for platters becomes increasingly higher, all of the dimensions of read sensors, such as stripe height, width and thickness are shrinking. The more lapping that is performed in order to achieve a shorter target stripe height the more serious misalignments tend to be. Further, the shorter the stripe height the more sensitive the read sensors will be to mechanical stress.

According to one embodiment, the pinning layer 412's magnetic moment 412a can be re-oriented using magnetic field assisted annealing 270 resulting in a slider 280 with pinning layer 422's magnetic moment 422a oriented properly oriented. For example, the magnetic moment 422a depicted with pinning layer 422 points in a more preferred direction as compared to the misaligned magnetic moment 412a.

Magnetic Field Assisted Annealing

As already stated, the process of annealing involves applying an elevated temperature during a period of time. In field assisted annealing 270, an oriented magnetic field is also applied to the pre-sliders 260 during annealing process 270. Field assisted annealing 270 is performed on those pre-sliders 260 that have misaligned moments 412a resulting in corrected moments 422a, according to one embodiment. According to one embodiment, the annealing to saturation 220 can be performed in conjunction with a magnetic field, such as that used with field assisted annealing 270, in order to align moments.

According to one embodiment, the range of temperatures used for field assisted annealing 270 ranges from approximately 100 degrees Celsius to 220 degrees Celsius. According to a preferred embodiment, the temperature used for field assisted annealing 270 is approximately 180 degrees Celsius. According to yet another embodiment, the temperature used for the field assisted annealing 270 is less than or equal to the temperature used for the annealing to saturation 220.

According to one embodiment, the range of times that the field assisted annealing 270 is performed ranges from approximately 1 second to 2 hours. According to a preferred embodiment, the time that the field assisted annealing 270 is performed is 1 hour.

According to one embodiment, the field strength used while performing field assisted annealing ranges from approximately 5000 gauss to 50,000 gauss with a preferred embodiment of approximately 15,000 gauss. The specific temperature, time and magnetic field strength used for the field assisted annealing will depend on a read sensor's design, according to one embodiment.

As already stated, annealing could result in protrusions due to the overcoats expanding. However, since pre-sliders 230 were annealed to saturation the overcoats will not expand again in the event that the pre-sliders 260 are annealed again 270.

Results

Figure 5:
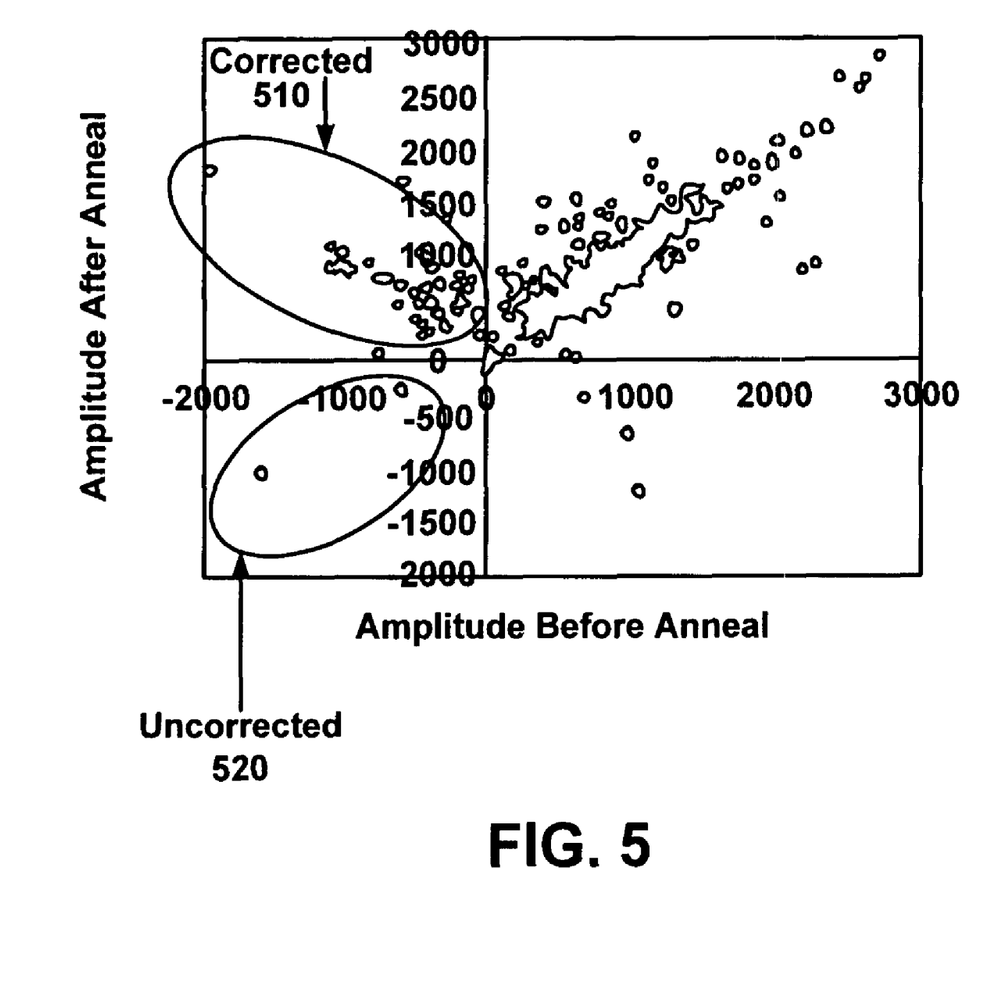
FIG. 5 depicts a chart showing the amplitude before and after field assisted annealing is performed, according to one embodiment of the present invention.

FIG. 5 depicts a chart showing the amplitude before and after field assisted annealing is performed, according to one embodiment of the present invention. The X axis represents the amplitude after field assisted annealing 270 is performed. The Y quadrant where the X axis is negative and the Y axis is positive, depicts pre-sliders that were corrected 510 using field assisted annealing 270. For example, the amplitudes were reversed before the field assisted annealing 270 was performed but amplitudes were corrected 510 after the field assisted annealing 270 was performed. The quadrant where the X axis is negative and the Y axis is negative depicts pre-sliders that were not corrected 520. For example, the amplitudes were reversed before the field assisted annealing 270 was performed and the amplitudes remained reversed after the field assisted annealing 270 was performed.

Note that as a result of performing field assisted annealing 270, many of the amplitudes were corrected 510 resulting in an increased number of pre-sliders manufactured per wafer. Further, the ability to correct 510 amplitudes enables read heads with shorter stripe heights to be manufactured. For example, as already stated, as the recording density for platters becomes increasingly higher, all of the dimensions of read sensors, such as stripe height, width and thickness are shrinking. The more lapping that is performed on a pre-slider to achieve a shorter stripe height the more serious misalignments tend to be. As already described herein, field assisted annealing 270 can be used to correct 510 reversed amplitudes.

If field assisted annealing 270 were performed without annealing to saturation 220, the overcoat 132 would continue to expand. However, since annealing to saturation 220 is performed before field assisted annealing 270, the overcoat 132 will not continue to expand. Therefore, according to one embodiment, annealing to saturation 220 enables field assisted annealing 270.

There has been a long felt need for a method to deal with pre-sliders 130 that have protrusions 136. Further, as can be seen from FIG. 5 annealing to saturation 220 enables dramatic results that can be achieved using field assisted annealing 270.

Operational Example

Figure 6:
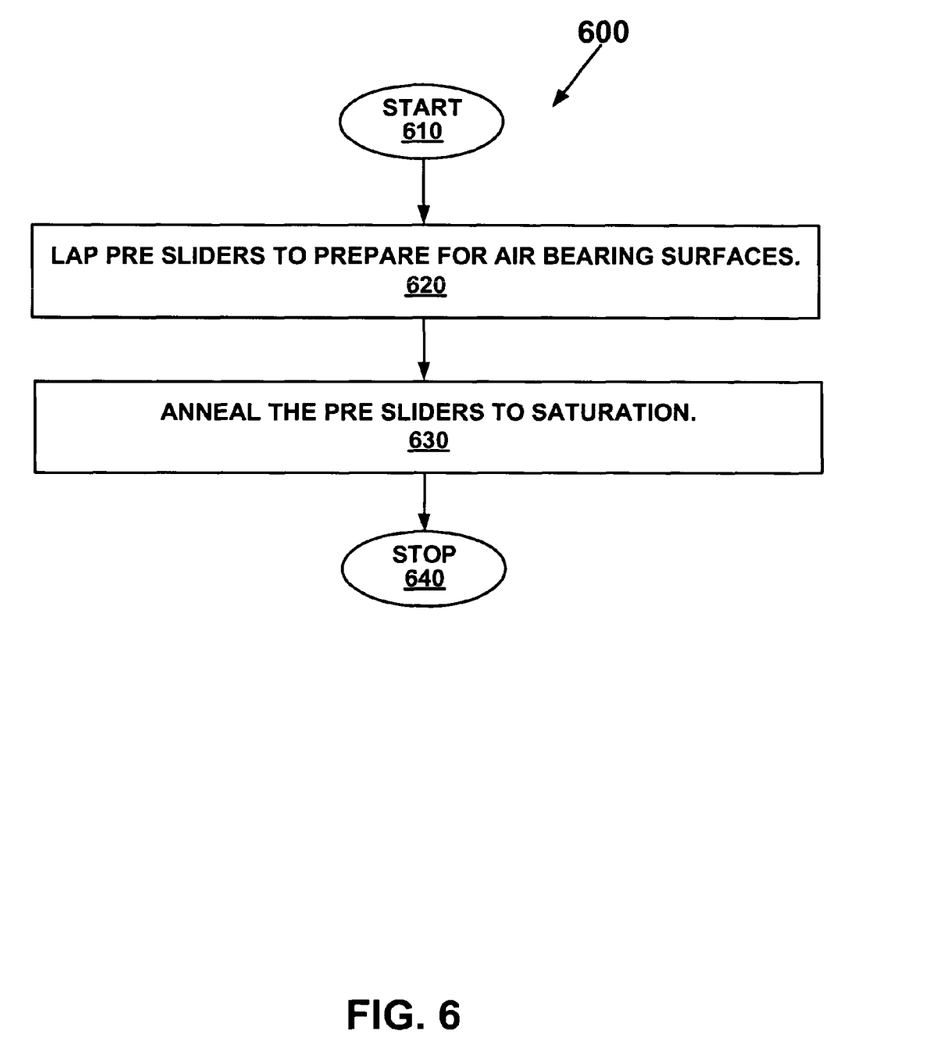
FIG. 6 depicts a flowchart 600 for a method of manufacturing pre-sliders, according to various embodiments of the present invention.
Figure 7:
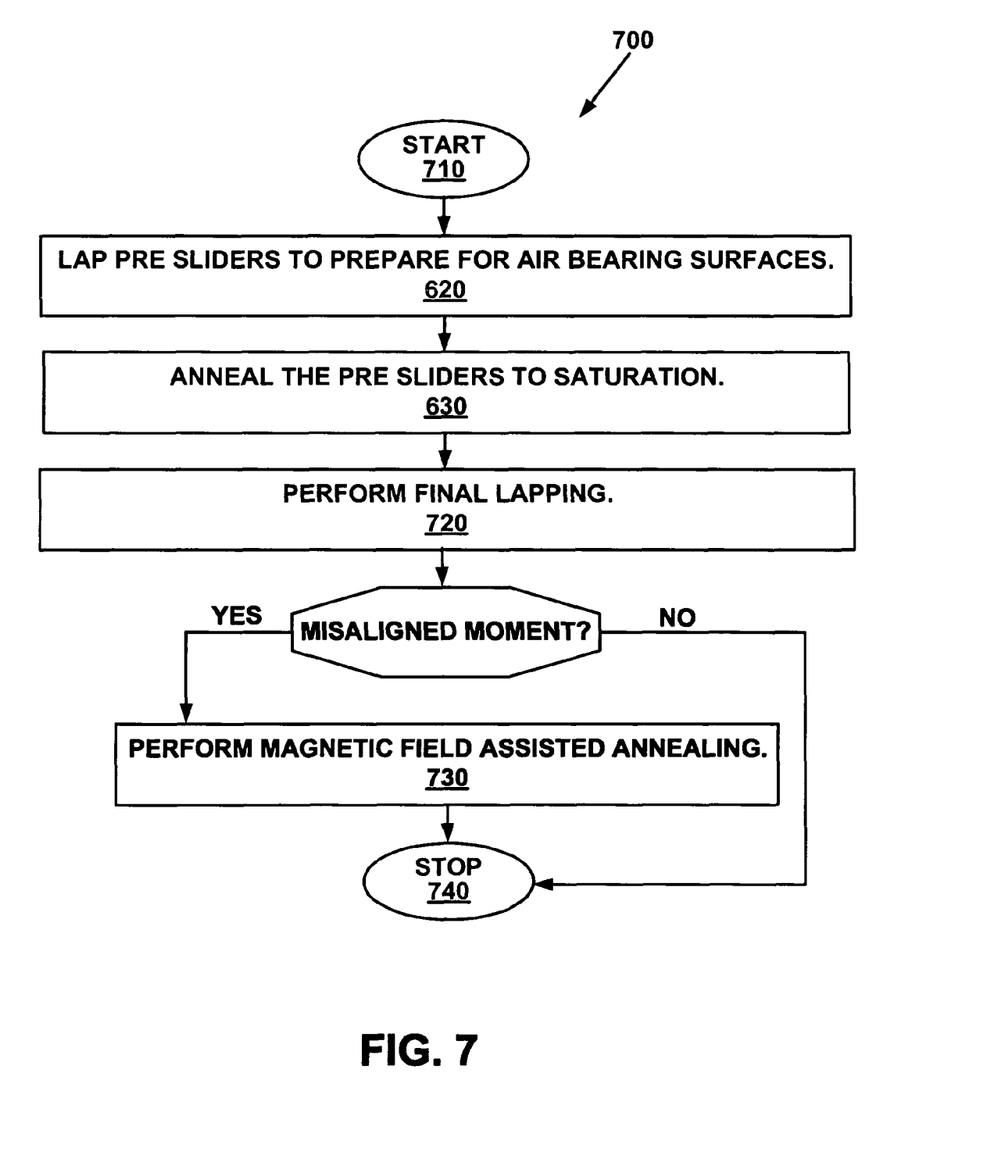
FIG. 7 depicts a flowchart 700 for a method of manufacturing pre-sliders, according to various embodiments of the present invention.

FIGS. 6 and 7 depict flowcharts 600, 700 for methods of manufacturing pre-sliders, according to various embodiments of the present invention. Although specific steps are disclosed in flowcharts 600, 700, such steps are exemplary. That is, embodiments of the present invention are well suited to performing various other steps or variations of the steps recited in flowcharts 600, 700. It is appreciated that the steps in flowcharts 600, 700 may be performed in an order different than presented, and that not all of the steps in flowcharts 600, 700 may be performed.

In step 610, the process begins.

In step 620, pre-sliders associated with a wafer are lapped to prepare for air bearing surfaces for the pre-sliders. For example, the pre-sliders 110 can still be a part of a row that has been cut from a wafer. In this case, the row can be lapped resulting in pre-slider 110. Alternative pre-slider 110 can be an individual pre-slider. For example, the pre-sliders associated with a wafer can be cut into individual pre-sliders. The individual pre-sliders can be lapped, according to one embodiment.

In step 630, the pre-sliders are annealed to saturation to level off the amount of overcoat expansion. The pre-slider 110 is annealed to saturation 220 resulting in pre-slider 230 with protrusion 236. As already stated, according to one embodiment, annealing to saturation 220 enables field assisted annealing 270 because the overcoat will not continue to expand when the field assisted annealing 270 is performed.

Further, as already described herein, annealing to saturation 220 enables more pre-sliders to be manufactured per wafer (also commonly known as "higher manufacturing yield"). For example, referring to the discussion of FIG. 5, as a result of performing field assisted annealing 270 many of the amplitudes were corrected 510 resulting in an increased number of pre-sliders manufactured per wafer.

In step 630, the process stops.

Referring to FIG. 7, final lapping 250 can be performed in step 720 after pre-sliders are annealed to saturation in step 630. Further, in the event that the final lapping 250 results in misaligned moments, magnetic field assisted annealing 270 can be performed in step 730. As already described herein, negative amplitude due to the flipping of a pinning-layer moment can be used as an indication of a misaligned moment.

Although FIG. 7 depicts determining whether a moment is misaligned at decision box 725, according to another embodiment, processing proceeds from step 720 to step 730 without determining whether the moment is misaligned. Further, although FIG. 7 depicts processing proceeding directly from step 630 to step 720, according to another embodiment, pre-sliders can be analyzed to determine whether they have protrusions and final lapping may only be performed, e.g., step 720, on those that have protrusions.

Further, it shall be pointed out that performing final lapping on pre-sliders that have protrusions can include performing final lapping on all pre-sliders regardless of whether they have protrusions since the former is a subset of the later. Lastly it shall be pointed out that performing magnetic field assisted annealing on pre-sliders that have misaligned magnetic moments can include performing magnetic field assisted annealing on all pre-sliders regardless of whether they have misaligned magnetic moments since the former is a subset of the later.

What is claimed is:

1. A method of manufacturing pre-sliders for read write heads by annealing to saturation, the method comprising:
   lapping pre-sliders associated with a wafer to prepare for air bearing surfaces for the pre-sliders; and
   annealing the pre-sliders to saturation to level off the amount of overcoat expansion for the pre-sliders.

2. The method as recited in claim 1, wherein the annealing of the pre-sliders to saturation further comprises:
   annealing the pre-sliders for a time that ranges from approximately a few seconds to 4 hours.

3. The method as recited in claim 2, wherein the annealing of the pre-sliders for the time, further comprises:
   annealing the pre-sliders for approximately 3 hours.

4. The method as recited in claim 1, wherein the annealing of the pre-sliders to saturation further comprises:
   annealing the pre-sliders using a temperate that ranges from approximately 100 degrees Celsius to 220 degrees Celsius.

5. The method as recited in claim 4, wherein the annealing of the pre-sliders to saturation using the temperature further comprises:
   annealing the pre-sliders using a temperate of approximately 200 degrees Celsius.

6. A method as recited in claim 1, further comprising:
   performing final lapping on pre-sliders that have protrusions.

7. A method as recited in claim 6, wherein the performing of the final lapping on the pre-sliders that have protrusions further comprises:
   performing the final lapping until a pinning layer and a free layer associated with the pre-sliders are approximately 0.1 micron long.

8. A method as recited in claim 1, further comprising:
   performing a magnetic field assisted annealing on pre-sliders that have misaligned magnetic moments using an oriented magnetic field to re-align pinning layers associated with the pre-sliders that have misaligned magnetic moments.

9. A method as recited in claim 8, wherein the performing of the magnetic field assisted annealing on the pre-sliders that have misaligned magnetic moments further comprises:
   performing the magnetic field assisted annealing on the pre-sliders that have misaligned magnetic moments for a time that ranges from approximately 1 second to 2 hours.

10. A method as recited in claim 9, wherein the performing of the magnetic field assisted annealing on the pre-sliders that have misaligned magnetic moments for the time further comprises:
    performing the magnetic field assisted annealing on the pre-sliders that have misaligned magnetic moments for approximately 1 hour.

11. A method as recited in claim 10, wherein the performing of the magnetic field assisted annealing of the pre-sliders that have misaligned magnetic moments for the time further comprises:
    performing the magnetic field assisted annealing on the pre-sliders that have misaligned magnetic moments using a temperature of approximately 180 degrees Celsius.

12. A method as recited in claim 8, wherein the performing of the magnetic field assisted annealing on the pre-sliders that have misaligned magnetic moments further comprises:
    performing the magnetic field assisted annealing on the pre-sliders that have misaligned magnetic moments using a temperature that ranges from approximately 100 degrees Celsius to 220 degrees Celsius.

13. A method as recited in claim 8, wherein the performing of the magnetic field assisted annealing of the pre-sliders that have misaligned magnetic moments further comprises:
    performing the magnetic field assisted annealing for a time that is less than or equal to a time that the annealing the pre-sliders to saturation was performed.

14. A method as recited in claim 8, wherein the performing of the magnetic field assisted annealing of the pre-sliders that have misaligned magnetic moments further comprises:
    performing the magnetic field assisted annealing using a field strength that ranges from approximately 5000 gauss to 50,000 gauss.

15. A method as recited in claim 8, wherein the performing of the magnetic field assisted annealing of the pre-sliders that have misaligned magnetic moments further comprises:
    performing the magnetic field assisted annealing using a field strength of approximately 15,000 gauss.

16. A method as recited in claim 1, wherein the annealing of the pre-sliders to saturation further comprises:
    annealing the pre-sliders to saturation, wherein the pre-sliders are individual pre-sliders.

17. A method as recited in claim 1, wherein the annealing of the pre-sliders to saturation further comprises:
   annealing the pre-sliders to saturation, wherein the pre-sliders are in row form.

18. A method of manufacturing a pre-slider for read write heads by annealing to saturation, the method comprising:
   lapping a pre-slider to prepare for air bearing surfaces for the pre-slider;
   annealing the pre-sliders to saturation to level off the amount of overcoat expansion for the pre-sliders;
   performing final lapping on the pre-slider if the pre-slider has a protrusion; and
   performing a magnetic field assisted annealing on the pre-slider if the pre-slider has a misaligned magnetic moment, wherein the magnetic field assisted annealing uses an oriented magnetic field to re-align a pinning layer associated with the pre-slider.

19. The method as recited in claim 18, wherein the annealing of the pre-slider to saturation further comprises:
   annealing the pre-slider for a time that ranges from approximately a few seconds to four hours.

20. The method as recited in claim 18, wherein the annealing of the pre-slider to saturation further comprises:
   annealing the pre-slider using a temperature that ranges from approximately 100 degrees Celsius to 220 degrees Celsius.

* * * * *